(12) United States Patent
Yamada

(10) Patent No.: US 9,352,811 B2
(45) Date of Patent: May 31, 2016

(54) SENSOR ACCOMMODATION CONTAINER FOR A PNEUMATIC FENDER AND PNEUMATIC FENDER

(75) Inventor: Shu Yamada, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 256 days.

(21) Appl. No.: 14/348,542

(22) PCT Filed: Jun. 25, 2012

(86) PCT No.: PCT/JP2012/066150
§ 371 (c)(1),
(2), (4) Date: Jun. 3, 2014

(87) PCT Pub. No.: WO2013/046832
PCT Pub. Date: Apr. 4, 2013

(65) Prior Publication Data
US 2014/0305360 A1  Oct. 16, 2014

(30) Foreign Application Priority Data

Sep. 30, 2011  (JP) .................................. 2011-216049

(51) Int. Cl.
*B63B 59/02* (2006.01)
*E02B 3/26* (2006.01)
*G01L 17/00* (2006.01)

(52) U.S. Cl.
CPC . *B63B 59/02* (2013.01); *E02B 3/26* (2013.01); *G01L 17/00* (2013.01)

(58) Field of Classification Search
CPC ..... E02B 3/26; B63B 2059/025; G01L 17/00; G01L 19/086
See application file for complete search history.

(56) References Cited

U.S. PATENT DOCUMENTS

| 5,945,606 A | 8/1999 | Tokunaga et al. |
| 6,448,903 B1 * | 9/2002 | Hattori ................. G01L 19/086 114/219 |
| 2013/0076536 A1 * | 3/2013 | Nakatani ............... G08C 17/02 340/870.02 |

FOREIGN PATENT DOCUMENTS

| JP | 08043226 A | * | 2/1996 |
| JP | H08-43226 |  | 2/1996 |
| JP | H08-207522 |  | 8/1996 |
| JP | H09-049218 |  | 2/1997 |
| JP | H09-049219 |  | 2/1997 |
| JP | H10-122914 |  | 5/1998 |
| JP | 2007-178214 |  | 7/2007 |
| JP | 2010168832 A | * | 8/2010 |

OTHER PUBLICATIONS

International Search Report dated Aug. 7, 2012, 4 pages, Japan.

* cited by examiner

*Primary Examiner* — Edwin Swinehart
(74) *Attorney, Agent, or Firm* — Thorpe North & Western

(57) ABSTRACT

A sensor accommodation container, attached to a cap member of a pneumatic fender and installed inside a fender bag, includes a container body attached to a through hole penetrating the cap member so as to be able to move and protrude out of the fender bag and held at a predetermined protruded position, a lid for closing the through hole, a first seal member for sealing a gap between the container body and the through hole, a communication hole for communicating inside and outside of the container body when the container body has been installed inside the fender bag and a second seal member for shutting off the communication between the inside and the outside of the fender bag via the communication hole when the container body has been held at a predetermined protruded position.

16 Claims, 4 Drawing Sheets

SENSOR ACCOMMODATION CONTAINER FOR A PNEUMATIC FENDER AND PNEUMATIC FENDER

TECHNICAL FIELD

The present technology relates to a sensor accommodation container for a pneumatic fender and a pneumatic fender, more specifically, a sensor accommodation container for a pneumatic fender and a pneumatic fender that allow for easier operation for installing the sensor inside a fender bag and easier operation for replacing the sensor.

BACKGROUND

The pneumatic fender is arranged to hermetically seal the air inside to obtain a predetermined characteristics such as mitigation of the impact. Therefore, it is preferable to know the internal pressure for having the normal function. In recent years, provided have been various methods for knowing the internal pressure of the pneumatic fender by receiving the sensed signal from the air pressure sensor installed inside the pneumatic fender by the radio communication (for example, see Japanese Patent Application Laid-Open No. 8-43226 and Japanese Patent Application Laid-open No. 2007-178214).

Conventionally, the air pressure sensor is fixedly installed in a stable state in the bag or to a cap member, and therefore the installation operation or the replacement operation of the air pressure sensor requires the removal of the cap member after the landing of the fender and the discharging of the air in it. Thus, there has been a problem that it requires significant time and labor in the operation for installing the air pressure sensor inside the fender bag and the operation for replacing it.

SUMMARY

The present technology provides a sensor accommodation container for a pneumatic fender and a pneumatic fender that allow for easier operation for installing the sensor inside the pneumatic fender bag and easier operation for replacing the sensor.

A sensor accommodation container for a pneumatic fender of the present technology may be a sensor accommodation container, attached to a cap member of the pneumatic fender and installed inside a fender bag, including: a container body attached to a through hole penetrating the cap member so as to be able to move and protrude out of the fender bag and held at a predetermined protruded position; a lid for closing the through hole; a first seal member for sealing a gap between the container body and the through hole; a communication hole for communicating inside and outside of the container body when the container body has been installed inside the fender bag; and a second seal member for shutting off the communication between the inside and the outside of the fender bag via the communication hole when the container body has been held at a predetermined protruded position.

The pneumatic fender of the present technology includes the sensor accommodation container described above.

According to the present technology, the container body attached so as to be able to move and protrude out of the fender bag and held at the predetermined protruded position is provided, which allows for easily putting the sensor in and out of the container body that is held at the predetermined protruded position. Therefore, for the installation of the sensor inside the fender bag, the container body containing the sensor is pressed inward to the fender bag, and then the through hole is closed by the lid. For the replacement of the sensor, the lid is removed to have the container body move and protrude out of the fender bag and then stop to be held at the predetermined protruded position. In this state, the sensor can be removed from the container body. Provided is the communication hole for communicating the inside and the outside of the container body when the container body has been installed inside the fender bag, so that the sensor installed inside the fender bag can sense the internal information (pressure, temperature, and the like) of the fender with a high accuracy.

Provided are the first seal member for sealing the gap between the container body and the through hole and the second seal member for shutting off the communication between the inside and the outside of the fender bag via the communication hole, when the container body has been held at a predetermined protruded position, which allows the internal pressure of the fender to be maintained substantially constant during the installation operation and the replacement operation of the sensor.

Therefore, compared to the conventional art, the present technology allows for the reduction in time and the reduction in labor of the installation operation and the replacement operation of the sensor.

The accommodation container of the present technology is designed such that, for example, the container body is a bottomed cylinder with one end opened and has a flange part at the other end, the communication hole is formed in a peripheral wall of the container body, and the second seal member is attached to at least one of the flange part and a part of the cap member opposing to the flange part. This design allows the flange part to come into contact with a part of the cap member opposing to the flange part when the container body moves and protrudes out of the fender bag, so that the flange part can be a stopper for holding the container body at the predetermined protruded position. Further, at the same time when the flange part functions as the stopper, the second seal member shuts off the communication between the inside and the outside of the fender bag via the communication hole.

Further, it is designed such that, for example, a protrusion length from a bottom of the cap member of the container body held at the predetermined protruded position is set to be less than or equal to a depth of the cap member. According to this design, the container body does not protrude out of the cap member at all time, which allows for the reduction of the risk that the container body is damaged when the fender is conveyed or stored. Accordingly, this also allows for easier operation for folding the fender bag into a small shape.

Various sensors for sensing the internal information of the pneumatic fender can be accommodated in the container body. For example, a sensor that wirelessly communicates with a receiver located outside the pneumatic fender may be accommodated.

DETAILED DESCRIPTION

Figure 1:
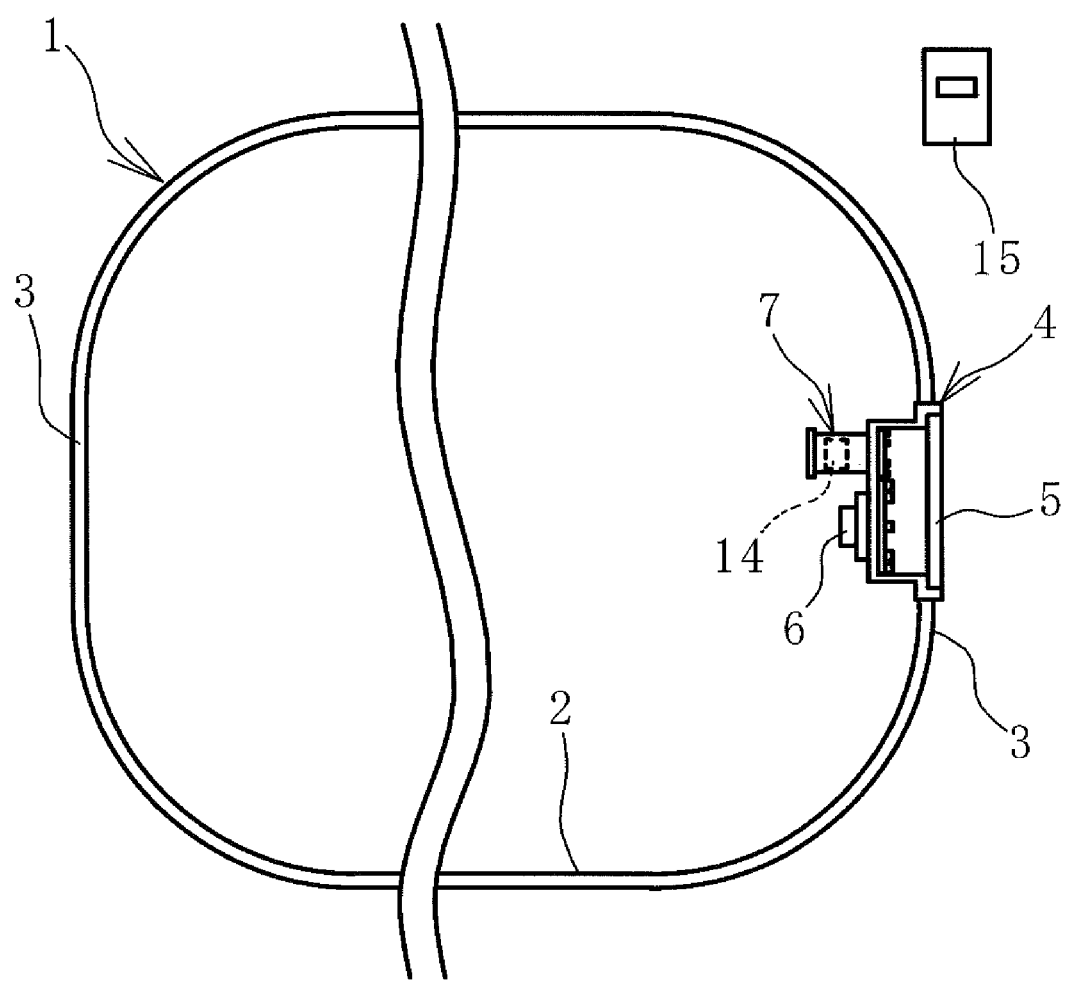
FIG. 1 is an outline view illustrating a pneumatic fender of the present technology in a vertical cross section.

A sensor accommodation container for a pneumatic fender and a pneumatic fender of the present technology will be described below based on embodiments illustrated in the drawings.

As illustrated in FIG. 1 to FIG. 4, a pneumatic fender 1 (hereafter, referred to as "fender 1") of the present technology includes a sensor accommodation container 7 of the present technology. The main material of the fender 1 is a rubber, the both ends thereof are provided with bowl-shaped mirror sections 3, and has a fender bag 2 formed in a cylindrical shape. Although a cap member 4 is provided to one of the mirror sections 3 in the embodiment, it may be provided to both mirror sections 3.

The sensor accommodation container 7 is attached to the cap member 4. The cap member 4 is a metal member having a cylindrical concave shape, and the opening of the cap member 4 is covered with a metal lid 5 attached by bolts and the like. To the cap member 4, attached are a safety valve 6, an inner pressure confirmation valve 16, an air supply valve 17, for example, besides the sensor accommodation container 7. Further, a sensor 14 including an air pressure sensor and/or a temperature sensor, and the like is accommodated in the sensor accommodation container 7.

The sensor 14 transmits the sensed internal information of the fender 1 to a receiver 15 located outside the fender 1 by the radio communication. For example, the sensor 14 senses the internal pressure and/or the internal temperature and the like of the fender 1 and transmits the sensed data, and then the receiver 15 receives it, so that the internal pressure and/or the internal temperature, and the like of the fender 1 can be easily known from the outside.

The container body 8 is preferably made of non-metal material so as not to shield the radio wave of the sensed data signal transmitted by the sensor 14. For example, the container body 8 may be formed of a resin such as the polycarbonate resin, the acrylonitrile butadiene styrene resin, the polyvinyl chloride resin, the polypropylene resin, and the like.

The sensor accommodation container 7 includes a container body 8 in which the sensor 14 is accommodated, a lid 11 attached to the cap member 4 by bolts to close a through hole 4a, a first seal member 12, and a second seal member 13. The container body 8 is a bottomed cylindrical body with one end open, for example, and thus a cylindrical one or a square tube one may be used. Further, the container body 8 is provided with a communication hole 9 penetrating the peripheral wall.

In the embodiment, the other end of the container body 8 is provided with a flange part 10 expanded in the circumference direction outer than the peripheral wall. The flange part 10 may have an annular shape that is continuous in the circumferential direction or a shape that is discontinuous in the circumferential direction. Further, a protruded stopper 8a is provided to the peripheral wall of one end in the container body 8.

The container body 8 is attached to the through hole 4a penetrating the cap member 4 so as to be able to move and protrude out of the fender bag 2. That is, the container body 8 is provided so as to be able to slide in the cylinder axis direction with respect to the through hole 4a. When the container body 8 moves and protrudes out of the fender bag 2, the flange part 10 is unable to pass through the through hole 4a having a smaller outer diameter than the flange part 10 and thus comes into contact with the cap member 4, so that the container body 8 is held at a predetermined protruded position.

The first seal member 12 is a rubber O ring attached to the peripheral wall surface of the through hole 4a, for example. The first seal member 12 comes into contact with the outer surface of the peripheral wall of the container body 8, so that the gap between the container body 8 and the through hole 4a is sealed in an airtight manner.

The second seal member 13 is a rubber O ring attached to the collar surface of the flange part 10, for example. As described later, when the container body 8 is held at the predetermined protruded position, the second seal member 13 shuts off the communication via the communication hole 9 between the inside and the outside of the fender bag 2.

Figure 4:
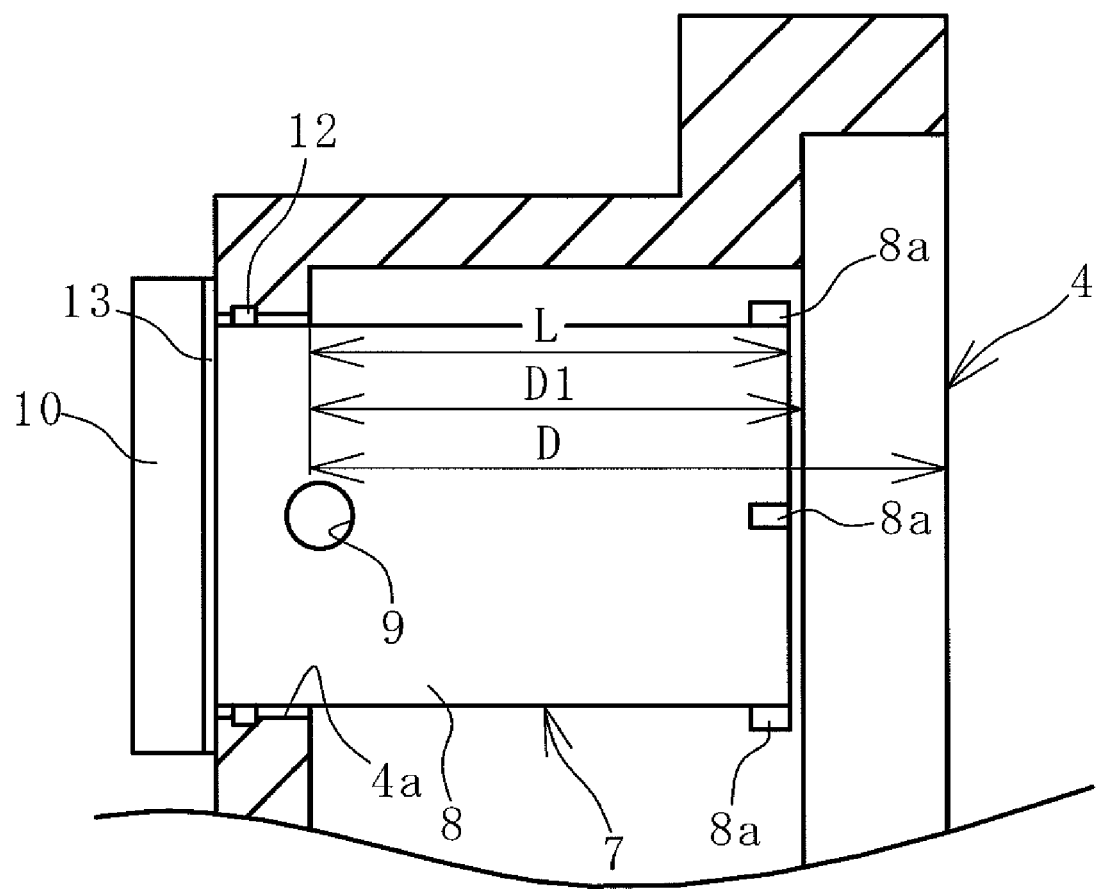
FIG. 4 is an explanatory view illustrating, in a vertical cross section, a state where a container body of a sensor accommodation container is held at predetermined protruded positions.

When the sensor 14 is installed inside the fender bag 2, the sensor 14 is accommodated in the container body 8 that is inserted to the through hole 4a and held by the cap member 4 at the predetermined protruded position, as illustrated in FIG. 4. In this state, the container body 8 is pressed outward by the inner pressure of the fender 1. This allows the container body 8 to be held by the cap member 4 at the predetermined protruded position with the second seal member 13 contacting to the end surface of the cap member 4 and the contacting surfaces being sealed in an airtight manner. Therefore, there is no communication between the inside and the outside of the fender bag 2 via the communication hole 9 and there is no leakage of the air filled inside.

Next, the container body 8 accommodating the sensor 14 is pressed inward to the fender bag 2. The inner pressure of the fender 1 in a use with the air filled is approximately 5 kPa to 80 kPa, so that the container body 8 can be pressed in by manual operation. Here, since the gap between the container body 8 and the through hole 4a is sealed by the first seal member 12 in an airtight manner, there is no leakage of the air filled inside the fender bag 2.

Since the stopper 8a is provided, the stopper 8a is latched with a latch groove formed in the through hole 4a when the container body 8 has been pressed in. This can prevent the entire container body 8 from passing through the through hole 4a and dropping inside the fender bag 2.

Next, the lid 11 is attached to the cap member 4 to close the through hole 4a. The container body 8 is pressed toward the lid 11 by the inner pressure of the fender 1. In this way, the sensor 14 is installed inside the fender bag 2. Then, a metal lid 5 is attached to the cap member 4 to have the state illustrated in FIG. 2.

When the sensor 14 installed inside the fender bag 2 is replaced, the reverse procedure to the installation operation of the sensor 14 as described above is applied. In response to the removal of the lid 11 from the cap member 4, the container body 8 moves and protrudes by itself due to the inner pressure of the fender 1, stops at the predetermined protruded position, and is held at that state.

Figure 2:
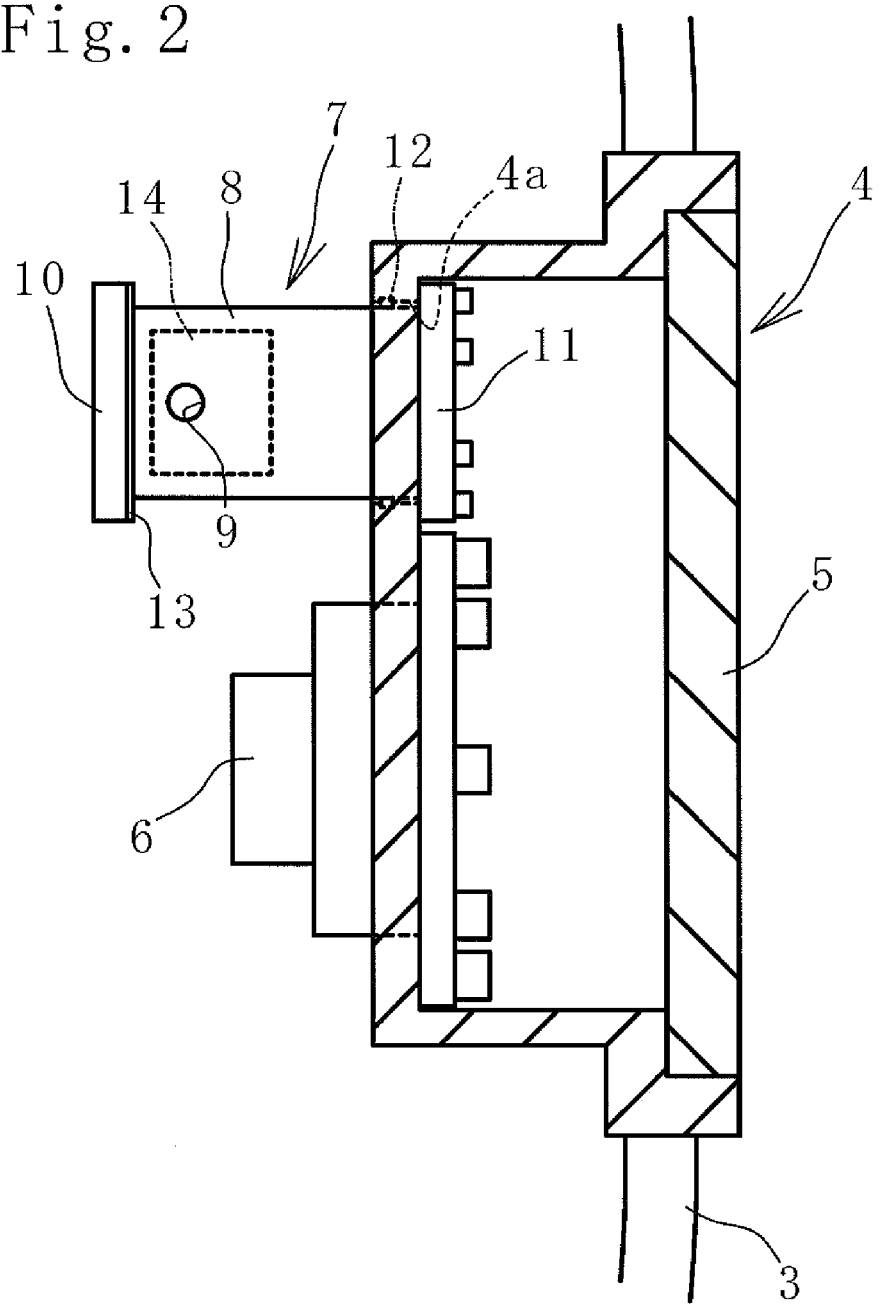
FIG. 2 is a vertical cross-sectional view illustrating the periphery of a cap member.
Figure 3:
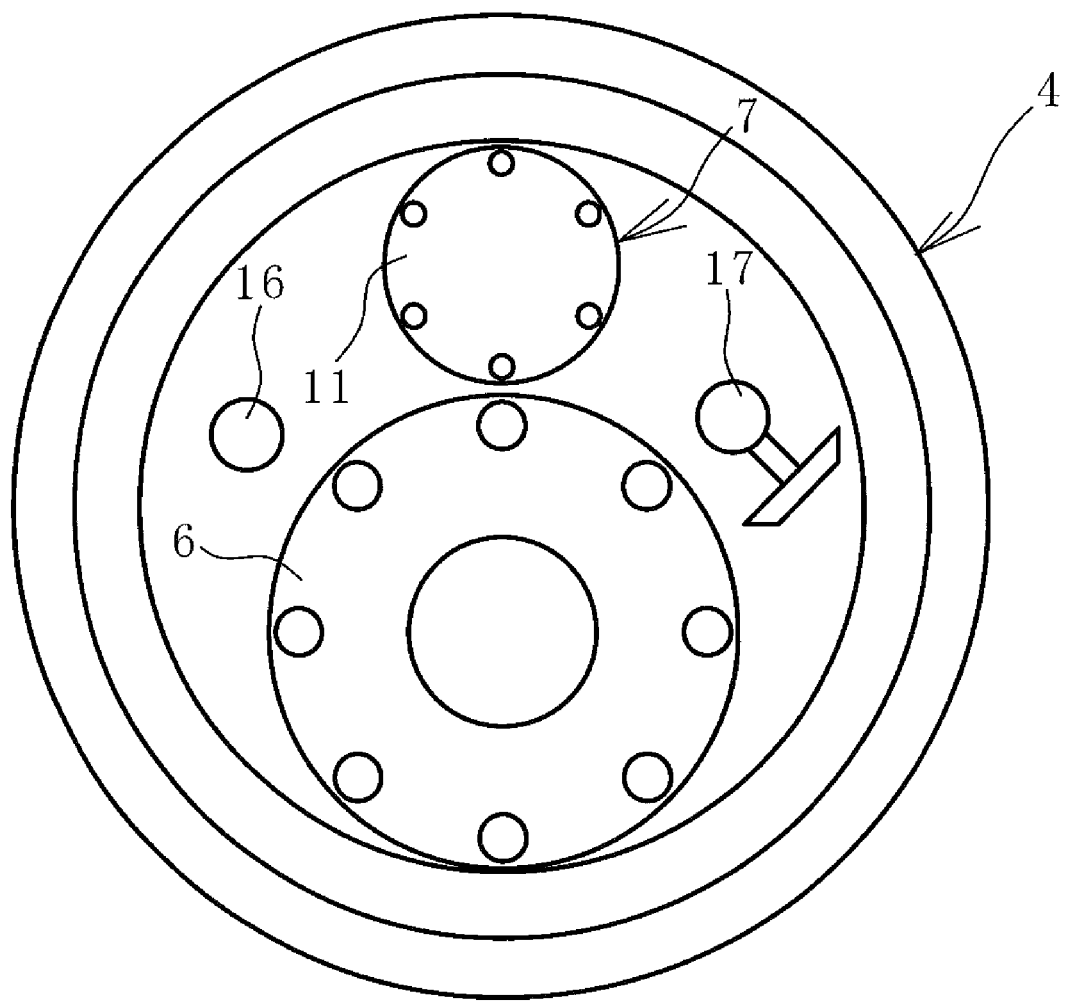
FIG. 3 is a plan view illustrating the periphery of the cap member.

When the container body 8 is installed inside the fender bag 2 as illustrated in FIG. 2, the inside and the outside of the container body 8 are communicated through the communication hole 9. This allows the sensor 14 installed inside the fender bag 2 to sense the internal information (pressure, temperature, and the like) of the fender 1 with a high accuracy.

As described above, according to the present technology, the sensor 14 can be easily put in and put out of the container body 8 with being held at the predetermined protruded position. Further, since the first seal member 12 and the second seal member 13 are provided, the inner pressure of the fender 1 can be maintained substantially constant during the installation operation and the replacement operation of the sensor 14. This allows for the installation operation and the replacement operation of the sensor 14 to be carried out in the site where the fender 1 is used.

Therefore, there is no need to land the fender 1 to discharge the internal air for the installation operation and the replacement operation of the sensor 14, so that the time required for the operation can be reduced compared to the conventional art and the labor in the operation can be also reduced.

The second seal member 13 may be attached to the part of the cap member 4 opposing to the flange part 10 rather than to the flange part 10. Alternatively, the second seal member 13 may be attached to both the flange part 10 and the part of the cap member 4 opposing to the flange part 10.

The length L protruded from the bottom of the cap member 4 of the container body 8 that is held at the predetermined protruded position is preferably set to be less than or equal to the depth D of the cap member 4. With this arrangement, the container body 8 does not protrude out of the cap member 4 at all time, which allows for the reduction of the risk that the container body 8 may contact something and be damaged when the fender 1 is conveyed, stored, and the like. Accordingly, this also allows for easier operation for folding the fender bag 2 into a small shape.

In terms of protection of the container body 8, the protruded length L is preferably set to be less than or equal to the effective depth D1 of the cap member 4. The effective depth D1 refers to the value derived by subtracting the thickness of the metal lid 5 from the depth D of the cap member 4. In this case, the container body 8 does not contact with the metal lid 5 even after the metal lid 5 is attached.

It is noted that the container body 8 can be used for accommodating other type of sensor that does not wirelessly communicate with the receiver 15 that is located outside the fender 1.

The invention claimed is:

1. A sensor accommodation container for a pneumatic fender, the sensor accommodation container attached to a cap member of the pneumatic fender and installed inside a fender bag, comprising:
    a container body attached to a through hole penetrating the cap member so as to be able to move and protrude out of the fender bag and held at a predetermined protruded position;
    a lid for closing the through hole;
    a first seal member for sealing a gap between the container body and the through hole;
    a communication hole for communicating inside and outside of the container body when the container body has been installed inside the fender bag; and
    a second seal member for shutting off the communication between the inside and the outside of the fender bag via the communication hole when the container body has been held at the predetermined protruded position.

2. The sensor accommodation container for a pneumatic fender according to claim 1, wherein the container body is a bottomed cylinder with one end opened and has a flange part at the other end,
    the communication hole is formed in a peripheral wall of the container body, and
    the second seal member is attached to at least one of the flange part and a part of the cap member opposing to the flange part.

3. The sensor accommodation container for a pneumatic fender according to claim 1, wherein a protrusion length from a bottom of the cap member of the container body held at the predetermined protruded position is set to be less than or equal to a depth of the cap member.

4. The sensor accommodation container for a pneumatic fender according to claim 1, wherein a sensor that wirelessly communicates with a receiver located outside the pneumatic fender is accommodated in the container body.

5. A pneumatic fender comprising the sensor accommodation container according to claim 1.

6. The sensor accommodation container for a pneumatic fender according to claim 2, wherein a protrusion length from a bottom of the cap member of the container body held at the predetermined protruded position is set to be less than or equal to a depth of the cap member.

7. The sensor accommodation container for a pneumatic fender according to claim 2, wherein a sensor that wirelessly communicates with a receiver located outside the pneumatic fender is accommodated in the container body.

8. The sensor accommodation container for a pneumatic fender according to claim 3, wherein a sensor that wirelessly communicates with a receiver located outside the pneumatic fender is accommodated in the container body.

9. The sensor accommodation container for a pneumatic fender according to claim 6, wherein a sensor that wirelessly communicates with a receiver located outside the pneumatic fender is accommodated in the container body.

10. A pneumatic fender comprising the sensor accommodation container according to claim 2.

11. A pneumatic fender comprising the sensor accommodation container according to claim 3.

12. A pneumatic fender comprising the sensor accommodation container according to claim 4.

13. A pneumatic fender comprising the sensor accommodation container according to claim 6.

14. A pneumatic fender comprising the sensor accommodation container according to claim 7.

15. A pneumatic fender comprising the sensor accommodation container according to claim 8.

16. A pneumatic fender comprising the sensor accommodation container according to claim 9.

* * * * *